(12) United States Patent
Johnson et al.

(10) Patent No.: US 10,978,704 B2
(45) Date of Patent: *Apr. 13, 2021

(54) SYNTHESIZED, SURFACE-FUNCTIONALIZED, ACIDIFIED METAL OXIDE MATERIALS FOR ENERGY STORAGE, CATALYTIC, PHOTOVOLTAIC AND SENSOR APPLICATIONS

(71) Applicant: HHeLI, LLC, Tulsa, OK (US)

(72) Inventors: Paige L. Johnson, Tulsa, OK (US); Jonathan G. Neff, Tulsa, OK (US)

(73) Assignee: HHELI, LLC, Tulsa, OK (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/728,299

(22) Filed: Oct. 9, 2017

(65) Prior Publication Data
US 2018/0034049 A1 Feb. 1, 2018

Related U.S. Application Data

(63) Continuation of application No. 15/352,388, filed on Nov. 15, 2016, now Pat. No. 9,786,910.
(Continued)

(51) Int. Cl.
*H01M 4/48* (2010.01)
*C01G 19/02* (2006.01)
(Continued)

(52) U.S. Cl.
CPC .......... *H01M 4/483* (2013.01); *C01G 23/047* (2013.01); *C01G 25/02* (2013.01); *C01G 49/02* (2013.01);
(Continued)

(58) Field of Classification Search
CPC ........ H01M 4/483; H01M 4/48; H01M 4/387; H01M 4/131; H01M 4/622; H01M 2004/021; H01M 10/04
See application file for complete search history.

(56) References Cited

U.S. PATENT DOCUMENTS 6,171,571 B1   1/2001   Bedard et al.
6,670,300 B2  12/2003   Werpy et al.
(Continued)

FOREIGN PATENT DOCUMENTS

AU   2007330996132 B2   6/2008
AU   2007330996 C1      7/2014
(Continued)

OTHER PUBLICATIONS

Guangtao Zhang et al; Nanoscale Magnesium Hydroxide and Magnesium Oxide Powders: Control Over Size, Shape, and Structure via Hydrothermal Synthesis; Chemistry of Materials; Jan. 2001; vol. 13, No. 2, 2001.
(Continued)

*Primary Examiner* — Ula C Ruddock
*Assistant Examiner* — Matthew W Van Oudenaren
(74) *Attorney, Agent, or Firm* — GableGotwals

(57) ABSTRACT

An acidified metal oxide ("AMO") material, preferably in monodisperse nanoparticulate form 20 nm or less in size, having a pH<7 when suspended in a 5 wt % aqueous solution and a Hammett function $H_0$>−12, at least on its surface. The AMO material is useful in applications such as a battery electrode, catalyst, or photovoltaic component.

50 Claims, 10 Drawing Sheets

Related U.S. Application Data

(60) Provisional application No. 62/256,065, filed on Nov. 16, 2015, provisional application No. 62/256,059, filed on Nov. 16, 2015.

(51) Int. Cl.

| | | |
|---|---|---|
| *C01G 23/047* | (2006.01) | |
| *C01G 25/02* | (2006.01) | |
| *C01G 49/02* | (2006.01) | |
| *H01M 4/02* | (2006.01) | |
| *H01M 4/38* | (2006.01) | |
| *H01M 4/62* | (2006.01) | |
| *H01M 4/131* | (2010.01) | |
| *H01M 10/04* | (2006.01) | |

(52) U.S. Cl.
CPC .............. *H01M 4/48* (2013.01); *C01G 19/02* (2013.01); *C01P 2002/85* (2013.01); *C01P 2006/40* (2013.01); *H01M 4/131* (2013.01); *H01M 4/387* (2013.01); *H01M 4/622* (2013.01); *H01M 10/04* (2013.01); *H01M 2004/021* (2013.01)

(56) References Cited

U.S. PATENT DOCUMENTS

| | | |
|---|---|---|
| 6,746,983 B2 | 6/2004 | Gaffney et al. |
| 7,053,022 B2 | 5/2006 | Gaffney et al. |
| 7,147,834 B2 | 12/2006 | Wong et al. |
| 7,166,263 B2 | 1/2007 | Vanderspurt et al. |
| 7,314,682 B2 | 1/2008 | Thackeray et al. |
| 7,582,276 B2 | 9/2009 | Nonninger |
| 7,611,750 B2 | 11/2009 | Yi et al. |
| 7,612,011 B2 | 11/2009 | Vanderspurt et al. |
| 7,718,568 B2 | 5/2010 | Gaffney et al. |
| 7,732,096 B2 | 6/2010 | Thackeray et al. |
| 7,825,064 B2 | 11/2010 | Wong et al. |
| 8,088,707 B2 | 1/2012 | Kim et al. |
| 8,148,011 B2 | 4/2012 | Thackeray et al. |
| 8,173,827 B2 | 5/2012 | Chang et al. |
| 8,303,841 B2 | 11/2012 | Li et al. |
| 8,318,384 B2 | 11/2012 | Luo et al. |
| 8,383,077 B2 | 2/2013 | Thackeray et al. |
| 8,480,998 B2 | 7/2013 | Hagemeyer et al. |
| 8,493,711 B2 | 7/2013 | Seymour |
| 8,503,162 B2 | 8/2013 | Seymour |
| 8,614,878 B2 | 12/2013 | Seymour |
| 8,658,126 B2 | 2/2014 | Toledo Antonio et al. |
| 8,685,283 B2 | 4/2014 | Wei et al. |
| 8,759,245 B2 | 6/2014 | Chang et al. |
| 8,828,904 B2 | 9/2014 | Wei et al. |
| 8,871,374 B2 | 10/2014 | Vaughey et al. |
| 8,889,078 B2 | 11/2014 | Ji et al. |
| 8,921,257 B2 | 12/2014 | Hazin et al. |
| 8,926,860 B2 | 1/2015 | Sun et al. |
| 8,969,238 B2 | 3/2015 | Fehrmann et al. |
| 9,012,351 B2 | 4/2015 | Yang et al. |
| 9,098,001 B2 | 8/2015 | Tashiro et al. |
| 9,130,226 B2 | 9/2015 | Thackeray et al. |
| 9,786,910 B2 * | 10/2017 | Johnson ............ H01M 4/483 |
| 2002/0086213 A1 | 7/2002 | Utsugi et al. |
| 2003/0065216 A1 | 4/2003 | Tanimoto et al. |
| 2004/0201948 A1 | 10/2004 | Hosoya et al. |
| 2004/0219428 A1 * | 11/2004 | Nagayama ............ H01M 4/13 429/218.1 |
| 2005/0202171 A1 | 9/2005 | Shin |
| 2006/0188781 A1 | 8/2006 | Thackeray et al. |
| 2007/0048435 A1 * | 3/2007 | Suzuki ................ H01G 11/86 427/58 |
| 2007/0287067 A1 | 12/2007 | Takahashi et al. |
| 2008/0272740 A1 | 11/2008 | Martinet et al. |
| 2009/0017378 A1 | 1/2009 | Charest et al. |
| 2009/0027056 A1 | 1/2009 | Huang et al. |
| 2010/0016443 A1 | 1/2010 | Toledano et al. |
| 2010/0027192 A1 | 2/2010 | Perry et al. |
| 2010/0099031 A1 | 4/2010 | Kato et al. |
| 2010/0129724 A1 | 5/2010 | Kolosnitsyn |
| 2010/0203121 A1 | 8/2010 | Toledano et al. |
| 2011/0033746 A1 | 2/2011 | Liu et al. |
| 2011/0129709 A1 | 6/2011 | Ahn et al. |
| 2011/0206974 A1 | 8/2011 | Inoue et al. |
| 2011/0259244 A1 | 10/2011 | Herbig et al. |
| 2011/0305940 A1 | 12/2011 | Usami |
| 2012/0058397 A1 | 3/2012 | Zhamu et al. |
| 2012/0085978 A1 | 4/2012 | Tashiro et al. |
| 2012/0237819 A1 | 9/2012 | Ahn |
| 2012/0238842 A1 | 9/2012 | Colvin, Jr. et al. |
| 2013/0017340 A1 | 1/2013 | Brown et al. |
| 2013/0026409 A1 | 1/2013 | Baker et al. |
| 2013/0078518 A1 * | 3/2013 | Thackeray ............ H01M 4/505 429/221 |
| 2013/0216911 A1 | 8/2013 | Hosoya et al. |
| 2013/0224603 A1 | 8/2013 | Chen et al. |
| 2013/0255872 A1 | 10/2013 | Zhong |
| 2013/0266872 A1 | 10/2013 | Adamson et al. |
| 2013/0330640 A1 | 12/2013 | Badding et al. |
| 2014/0027670 A1 | 1/2014 | Sun et al. |
| 2014/0187413 A1 | 7/2014 | Lagaron Cabello et al. |
| 2014/0212694 A1 | 7/2014 | Park et al. |
| 2014/0242445 A1 | 8/2014 | Gozdz et al. |
| 2014/0343203 A1 | 11/2014 | Miltner et al. |
| 2015/0044565 A1 | 2/2015 | Wang et al. |
| 2015/0065667 A1 | 3/2015 | Cheng et al. |
| 2015/0069295 A1 | 3/2015 | Ho et al. |
| 2015/0079471 A1 | 3/2015 | Fang et al. |
| 2015/0087505 A1 | 3/2015 | Sanchez Valente et al. |
| 2015/0126774 A1 | 5/2015 | Hiraoka et al. |
| 2015/0151280 A1 | 6/2015 | Sanchez Valente et al. |
| 2015/0238937 A1 | 8/2015 | Kang et al. |
| 2015/0263342 A1 | 9/2015 | Newbound et al. |
| 2015/0287978 A1 | 10/2015 | Lockett et al. |
| 2015/0303459 A1 | 10/2015 | Kovalenko et al. |
| 2016/0293957 A1 | 10/2016 | Okae et al. |
| 2017/0214079 A1 | 7/2017 | Dai et al. |
| 2018/0294479 A1 * | 10/2018 | Johnson ............ C01G 23/047 |
| 2018/0337404 A1 * | 11/2018 | Johnson ............ H01M 4/483 |

FOREIGN PATENT DOCUMENTS

| | | |
|---|---|---|
| BR | PI0720068 A2 | 6/2008 |
| CA | 2637436 A1 | 8/2007 |
| CA | 2677185 A1 | 8/2008 |
| CA | 2824842 A1 | 8/2008 |
| CA | 2685475 A1 | 11/2008 |
| CA | 2744601 A1 | 6/2010 |
| CA | 2744601 C | 9/2013 |
| CA | 2677185 C | 12/2013 |
| CA | 2637436 C | 11/2014 |
| CN | 105543961 A | 5/2016 |
| DE | 102013206736 A1 | 10/2014 |
| DE | 102013224206 A1 | 5/2015 |
| EP | 2086678 A1 | 8/2006 |
| EP | 1739139 A1 | 1/2007 |
| EP | 1888311 A2 | 2/2008 |
| EP | 2104558 A2 | 6/2008 |
| EP | 1997169 A1 | 12/2008 |
| EP | 2118208 A2 | 11/2009 |
| EP | 1739139 B1 | 10/2010 |
| EP | 1888311 A4 | 6/2011 |
| EP | 2545776 A2 | 1/2013 |
| EP | 2662914 A2 | 11/2013 |
| EP | 2662915 A2 | 11/2013 |
| EP | 2545776 A3 | 12/2014 |
| EP | 2662914 A4 | 1/2015 |
| EP | 1997169 B1 | 8/2015 |
| JP | 2008013427 A | 1/2008 |
| JP | 2009535781 A | 10/2009 |
| KR | 101125593 B1 | 3/2012 |
| WO | 0023510 A1 | 4/2000 |
| WO | 2007129842 A1 | 11/2007 |
| WO | 2008066293 A1 | 6/2008 |
| WO | 2008072239 A2 | 6/2008 |

(56) References Cited

FOREIGN PATENT DOCUMENTS

| WO | 2008093347 A2 | 8/2008 |
|---|---|---|
| WO | 2008131551 A1 | 11/2008 |
| WO | 2015078745 A1 | 6/2015 |

OTHER PUBLICATIONS

T. Mousavand et al; Supercritical hydrothermal synthesis of organic-inorganic hybrid nanoparticles; Journal of Materials Science Mar. 2006, vol. 41, Issue 5, pp. 1445-1448.

Rabuffetti et al; Synthesis-Dependent Surface Acidity and Structure of SrTiO3 Nanoparticles; Dept of Chemistry, Northwestern University, J. Phys. Chem. C, 2010 114 (25), pp. 1056-11067.

V. Subramanian et al; Hydrothermal Synthesis and Pseudocapacitance Properties of MnO2 Nanostructures; J. Phys. Chem. B, 2005, 109 (43), pp. 20207-20214.

Chunwen Sun et al; Monodisperse Porous LiFePO4 Microspheres for a High Power Li-Ion Battery Cathode; Journal of the American Chemical Society; 2011, 133 (7), pp. 2132-2135.

Tadafumi Adschiri et al; Hydrothermal Synthesis of Metal Oxide Nanoparticles at Supercritical Conditions; Journal of Nanoparticle Research Jun. 2001, vol. 3, Issue 2, pp. 227-235.

Xun Wang et al; Selected-Control Hydrothermal Synthesis of alpha- and beta-MnO(2) Single Crystal Nanowires; Journal of the American Chemical Society, Apr. 2002, vol. 124, No. 12, 2002, pp. 2880-2881.

Y-Chun Chen et al; Size effect of tin oxide nanoparticles on high capacity lithium battery anode materials; Surface and Coatings Technology, vol. 202, Issues 4-7, Dec. 15, 2007, pp. 1313-1318.

Venere; Nanoparticle network could bring fast-charging batteries; Purdue University, Dec. 3, 2014.

Ying Ching Lu et al; Improved electrochemical performance of tin-sulfide anodes for sodium-ion batteries; Journal of Materials Chemistry A; Jun. 24, 2015.

Nitta et al; High-Capacity Anode Materials for Lithium-Ion Batteries: Choice of Elements and Structures for Active Particles; www.materialsviews.com; 2013.

Briois et al; Solid-State and Solution Structural Study of Acetylacetone-Modified Tin(IV) Chloride Used as a Precursor of SnO2 Nanoparticles Prepared by a Sol-Gel Route; American Chemical Society; published on Web Sep. 1, 2004.

Feng; The Synthesis and Characterization of Phosphonic Acids for the Surface Modification Study on Indium Tin Oxide; Dissertation Presented to Georgia Institute of Technology; Aug. 2012.

Hino et al; Reactions of Butane and Isobutane Catalyzed by Zirconium Oxide Treated with Sulfate Ion. Solid Superacid Catalyst; Journal of the American Chemical Society; Oct. 10, 1979.

Hofmann et al; Highly monodisperse water-dispersable iron oxide nanoparticles for biomedical applications; Jounral of Materials Chemistry; Aug. 11, 2010.

Holland et al; NMR Characterization of Phosphonic Acid Capped SnO2 Nanoparticles; American Chemical Society; vol. 19, No. 10, 2007; published on web Apr. 21, 2007.

Jouhannaud et al; Rapid synthesis of tin (IV) oxide ananparticles by microwave induced thermohydrolysis; Journal of Solid State Chemistry 181; 2008.

Lim et al; Spherical Tin Oxide, SnO2 Particles Fabricated via Facile Hydrothermal method for Detection of Mercury (II) Ions; International Journal of electrochemical Science; Sep. 1, 2011.

Sugunan et al; Catalysis by some metal oxides modified with phosphate ions; Indian Journal of chemistry; vol. 41A; Nov. 2002; pp. 2251-2255.

Munoz et al; Comparative study of two wet chemical methods of BaSnO3 synthesis; Mechanism of formation of mixed oxide; Powder Technology; vol. 279; pp. 86-95; 2015.

Queffelec et al; Surface Modification Using Phosphonic Acids and Esters; Chemical Reviews; 2012 American Chemical Society; vol. 112; pp. 3777-3807.

Barbe et al, "Nanocrystalline Titanium Oxide electrodes for Photovoltaic Applications", , pp. 3157-3171, vol. 80, No. 12, Publisher: Journal of the American Ceramic Society; 1997.

Pubchem Open Chemistry Database, "Ammonium Dihydrogen Phosphate", Mar. 22, 2016.

Zhou et al, "Ulra-Uniform SnOx/Carbon Nanohybrids toward Advanced Lithium-Ion Battery Anodes", "Advanced Materials 2014", pp. 39433949, vol. 26, Publisher: wileyonlinelibrary.com.

* cited by examiner

FIG. 3

| Reagents used for synthesis | O | S | Cl | Metal | pH |
|---|---|---|---|---|---|
| Metal-chloride and HCl | 58.6 | - | 2.3 | 27.9 | 2.0 |
| Metal-sulfate and $H_2SO$ | 58.3 | 2.0 | - | 26.2 | 1.2 |

FIG. 7

| Reagents used for synthesis | O | P | O-C=O | Metal |
|---|---|---|---|---|
| Metal-acetate and phosphoric acid | 59.6 | 3.0 | 0.4 | 27.3 |

SYNTHESIZED, SURFACE-FUNCTIONALIZED, ACIDIFIED METAL OXIDE MATERIALS FOR ENERGY STORAGE, CATALYTIC, PHOTOVOLTAIC AND SENSOR APPLICATIONS

CROSS-REFERENCE TO CO-PENDING APPLICATIONS

This application claims the benefit of U.S. Ser. No. 15/352,388, filed on Nov. 15, 2016, which in turn claimed the benefit of U.S. 62/256,065 and 62/256,059, both filed on Nov. 16, 2015, and incorporated by reference herein.

BACKGROUND OF THE INVENTION

This invention is in the field of materials useful in chemical energy storage and power devices such as, but not limited to, batteries. More specifically, the invention relates to synthesized, acidified metal oxide ("AMO") nanomaterials for use in applications such as electrochemical cell materials (batteries), catalysts, photovoltaic components, and sensors.

Metal oxides are compounds in which oxygen is bonded to metal, having a general formula $M_mO_x$. They are found in nature but can be artificially synthesized. In synthetic metal oxides the method of synthesis can have broad effects on the nature of the surface, including its acid/base characteristics. A change in the character of the surface can alter the properties of the oxide, affecting such things as its catalytic activity and electron mobility. The mechanisms by which the surface controls reactivity, however, are not always well characterized or understood. In photocatalysis, for example, the surface hydroxyl groups are thought to promote electron transfer from the conduction band to chemisorbed oxygen molecules.

Despite the importance of surface characteristics, the metal oxide literature, both scientific papers and patents, is largely devoted to creating new, nanoscale, crystalline forms of metal oxides for improved energy storage and power applications. Metal oxide surface characteristics are ignored and, outside of the chemical catalysis literature, very little innovation is directed toward controlling or altering the surfaces of known metal oxides to achieve performance goals.

The chemical catalysis literature is largely devoted to the creation of "superacids"—acidity greater than that of pure sulfuric acid (18.4 M $H_2SO_4$)—often used for large-scale reactions such as hydrocarbon cracking. Superacidity cannot be measured on the traditional pH scale, and is instead quantified by Hammet numbers. Hammet numbers (Ho) can be thought of as extending the pH scale into negative numbers below zero. Pure sulfuric acid has an $H_0$ of −12.

There are, however, many reaction systems and many applications for which superacidity is too strong. Superacidity may, for example, degrade system components or catalyze unwanted side reactions. However, acidity may still be useful in these same applications to provide enhanced reactivity and rate characteristics or improved electron mobility.

The battery literature teaches that acidic groups are detrimental in batteries, where they can attack metal current collectors and housings and cause deterioration in other electrode components. Further, the prior art teaches that an active, catalytic electrode surface leads to electrolyte decomposition which can result in gas generation within the cell and ultimately in cell failure.

A need exists for a synthetic metal oxide that is acidic but not superacidic at least on its surface.

SUMMARY OF THE INVENTION

A material according to this invention is a synthesized, acidified metal oxide ("AMO"), preferably in monodisperse nanoparticulate form 20 nm or less in size, having a pH<7 when suspended in a 5 wt % aqueous solution and a Hammett function $H_0$>−12, at least on its surface. The AMO material is useful in applications such as a battery electrode, catalyst, photovoltaic component, or sensor.

Preferably, synthesis and surface functionalization are accomplished in a "single-pot" hydrothermal method in which the surface of the metal oxide is functionalized as the metal oxide is being synthesized from appropriate precursors. This single-pot method does not require any additional step or steps for acidification beyond those required to synthesize the metal oxide itself, and results in an AMO material having the desired surface acidity (but not superacidic).

In a preferred embodiment, surface functionalization occurs using strong electron-withdrawing groups ("EWGs")—such as $SO_4$, $PO_4$, or halogens—either alone or in some combination with one another. Surface functionalization may also occur using EWGs that are weaker than $SO_4$, $PO_4$, or halogens. For example, the synthesized metal oxides may be surface-functionalized with acetate ($CH_3COO$), oxalate ($C_2O_4$), and citrate ($C_6H_5O_7$) groups.

BRIEF DESCRIPTION OF THE DRAWINGS

FIG. 3 is X-ray photoelectron spectroscopy (XPS) data showing surface functionalization arising endogeneously from the synthesis method disclosed herein. Numbers shown are atomic concentrations in %. The far right column lists the corresponding pH of the synthesized nanoparticles as measured when dispersed at 5 wt % in aqueous solution.

FIG. 7 is X-ray photoelectron spectroscopy analysis of the surface of AMO nanoparticles synthesized using both a strong (phosphorous containing) and weak (acetate) electron withdrawing group shows greater atomic concentration of phosphorous than of the bonds associated with acetate groups.

DEFINITIONS

Figure 1:
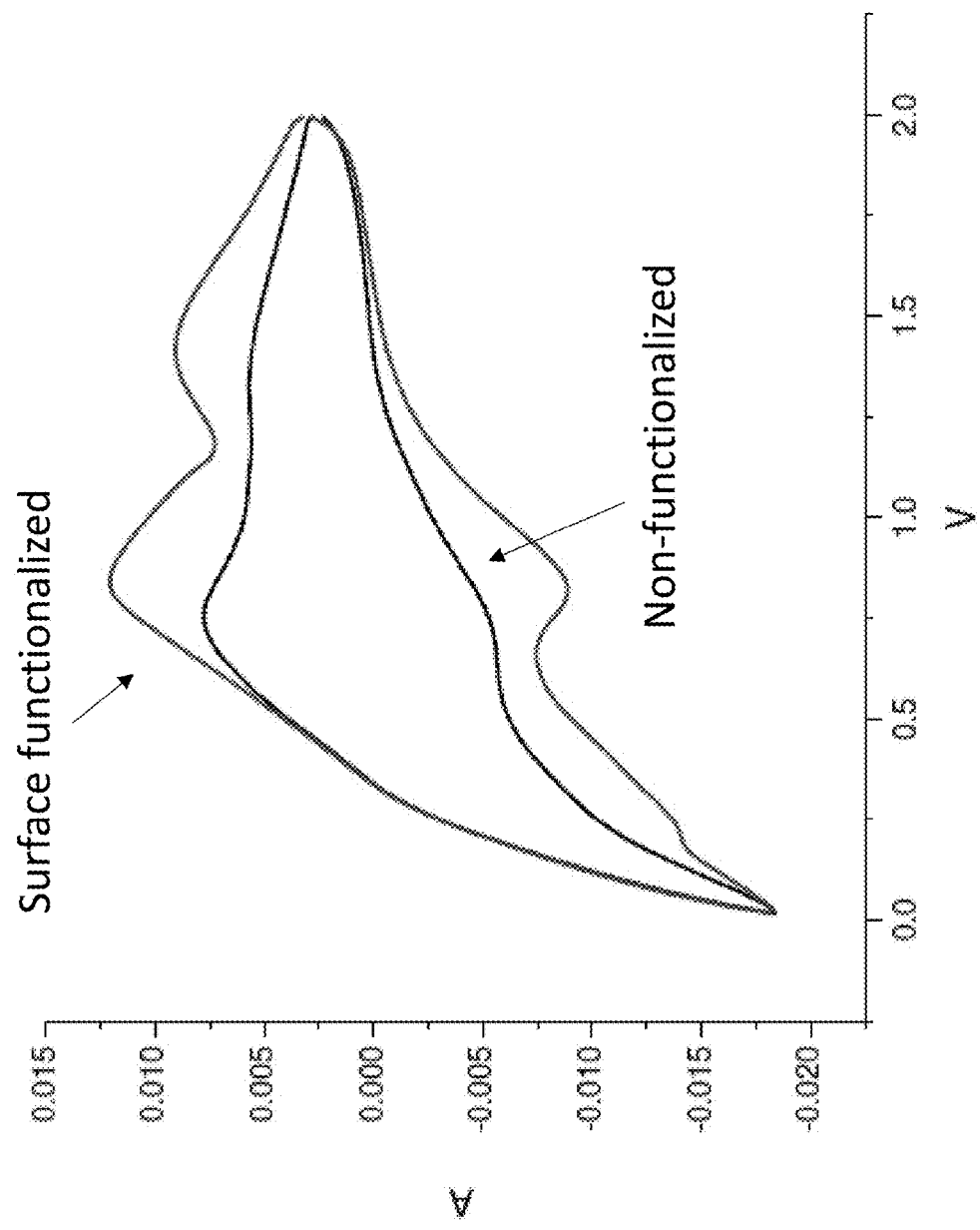
FIG. 1 shows differences in the cyclic voltammagram of AMO tin prepared by the method disclosed herein relative to that of commercially available, non-AMO tin when cycled against Li.

For the purposes of this disclosure, the following terms have the following meanings:

Acidic oxide—a term used generally in the scientific literature to refer to binary compounds of oxygen with a nonmetallic element. An example is carbon dioxide, $CO_2$. The oxides of some metalloids (e.g., Si, Te, Po) also have weakly acidic properties in their pure molecular state.

Acidified metal oxide ("AMO")—a term used here to denote a binary compound of oxygen with a metallic element which has been synthesized or modified to have an acidity greater than that of its natural mineralogical state and also a Hammet function, $H_0 > -12$ (not superacidic). The average particle size is also less than that of the natural mineralogical state. Naturally occurring mineralogical forms do not fall within the scope of the inventive AMO material. A synthesized metal oxide, however, that is more acidic than its most abundant naturally occurring mineralogical form (of equivalent stoichiometry) but not superacidic falls within the bounds of this disclosure and can be said to be an AMO material provided it satisfies certain other conditions discussed in this disclosure.

Acidic—a term used generally in the scientific literature to refer to compounds having a pH of less than 7 in aqueous solution.

Electron-withdrawing group ("EWG")—an atom or molecular group that draws electron density towards itself. The strength of the EWG is based upon its known behavior in chemical reactions. Halogens, for example are known to be strong EWGs. Organic acid groups such as acetate are known to be weakly electron withdrawing.

Hammet function—An additional means of quantifying acidity in highly concentrated acid solutions and in superacids, the acidity being defined by the following equation: $H_0 = pK_{BH+} + \log([B]/[BH+])$. On this scale, pure 18.4 molar $H_2SO_4$ has a $H_0$ value of $-12$. The value $H_0 = -12$ for pure sulfuric acid must not be interpreted as pH$=-12$, instead it means that the acid species present has a protonating ability equivalent to $H_3O^+$ at a fictitious (ideal) concentration of $10^{12}$ mol/L, as measured by its ability to protonate weak bases. The Hammett acidity function avoids water in its equation. It is used herein to provide a quantitative means of distinguishing the AMO material from superacids. The Hammet function can be correlated with colorimetric indicator tests and temperature programmed desorption results.

Metal oxide—a term used generally in the scientific literature to refer to binary compounds of oxygen with a metallic element. Depending on their position in the periodic table, metal oxides range from weakly basic to amphoteric (showing both acidic and basic properties) in their pure molecular state. Weakly basic metal oxides are the oxides of lithium, sodium, magnesium, potassium, calcium, rubidium, strontium, indium, cesium, barium and tellurium. Amphoteric oxides are those of beryllium, aluminum, gallium, germanium, astatine, tin, antimony, lead and bismuth.

Monodisperse—characterized by particles of uniform size which are substantially separated from one another, not agglomerated as grains of a larger particle.

pH—a functional numeric scale used generally in the scientific literature to specify the acidity or alkalinity of an aqueous solution. It is the negative of the logarithm of the concentration of the hydronium ion [$H_3O^+$]. As used here it describes the relative acidity of nanoparticles suspended in aqueous solution.

Surface functionalization—attachment of small atoms or molecular groups to the surface of a material.

Superacid—substances that are more acidic than 100% $H_2SO_4$, having a Hammet function, $H_0 < -12$.

DETAILED DESCRIPTION OF THE PREFERRED EMBODIMENTS

The preferred embodiments described here provide illustrative examples of acidified metal oxides ("AMOs") materials useful in applications such as a battery electrode, catalyst, or photovoltaic component. The surface of these AMO materials is acidic but not superacidic.

The surfaces of metal oxides are ideally arrays of metal and oxygen centers, ordered according to the crystalline structure of the oxide. In reality the arrays are imperfect, being prone to vacancies, distortion, and the effects of surface attachments. Regardless, any exposed metal centers are cationic (positively charged) and can accept electrons, thus functioning by definition as Lewis acid sites. Oxygen centers are anionic (negatively charged) and act as Lewis base sites to donate electrons. This leads to the well-known amphotericity of metal oxide surfaces.

Under normal atmospheric conditions, the presence of water vapor will adsorb to the metal oxide surface either molecularly (hydration) or dissociatively (hydroxylation). Both OH– and H+ species can adsorb on the oxide surface. The negatively-charged hydroxyl species will attach at the metal, cationic (Lewis acid, electron accepting) centers, and the H+ will attach at the oxygen, anionic (Lewis base, electron donating) centers. Both adsorptions lead to the presence of the same functional group—a hydroxyl—on the metal oxide surface.

These surface hydroxyl groups can serve as either Brønsted acids or as Brønsted bases, because the groups can either give up or accept a proton. The tendency of an individual hydroxyl group to be a proton donor or a proton acceptor is affected by the coordination of the metal cation or oxygen anion to which it is attached. Imperfections of the metal oxide surface such as oxygen vacancies, or coordination of the surface groups with other chemical species, mean that all cations and anions are not equally coordinated. Acid-base sites will vary in number and in strengths. When broadly "totaled" across the surface of the oxide, this can give the surface an overall acidic or basic character.

The quantity and strength of Lewis acid and base sites—from the exposed metal cations and oxygen anions, respectively) and Brønsted acid and base sites (from the surface hydroxyl groups)—add broad utility and functionality to the metal oxide and its use in both chemical reactions and device applications. The sites are a strong contributor to the chemical reactivity of the metal oxide. They can serve as anchor sites to which other chemical groups, and even additional metal oxides, may be attached. And they can affect surface charge, hydrophilicity and biocompatibility.

One way of altering the surface of metal oxides is to attach small chemical groups or electron-withdrawing groups ("EWGs") in a process known as surface functionalization. The EWG induces polarization of the hydroxide bonds and facilitates dissociation of hydrogen. For example, a stronger EWG should lead to a more polarized bond and therefore a more acidic proton. The acidity of Lewis sites can be increased by inducing polarization that facilitates the donation of electrons to the site. When compounds so made are placed in water, the acidic protons will dissociate and so reduce the aqueous pH measurement.

Though somewhat imprecise when working with solid acid/base systems rather than liquid ones, traditional methods of pH measurement utilizing titrations, pH paper and pH probes can be used to evaluate the acidity of metal oxides dispersed in aqueous solution. These measurements can be supplemented by the use of techniques including but not limited to colorimetric indicators, infrared spectroscopy, and temperature programmed desorption data to establish the acidified nature of the metal oxide surface. Surface groups can be examined by standard analytical techniques including but not limited to x-ray photoelectron spectroscopy.

Surface functionalization can be accomplished post-synthesis, including but not limited to exposing the metal oxide to acidic solutions or to vapors containing the desired functional groups. It can also be accomplished via solid state methods, in which the metal oxide is mixed and/or milled with solids containing the desired functional groups. However, all of these methods require an additional surface functionalization step or steps beyond those required to synthesize the metal oxide itself.

Synthesis and surface functionalization of the AMO material may be accomplished in a "single-pot" hydrothermal synthesis method or its equivalent in which the surface of the metal oxide is functionalized as the metal oxide is being synthesized from appropriate precursors. A precursor salt containing an EWG is solubilized and the resulting solution is acidified using an acid containing a second EWG. This acidified solution is then basified and the basified solution is heated then washed. A drying step produces the solid AMO material.

By way of example, a preferred embodiment of an AMO form of tin oxide was synthesized and simultaneously surface functionalized using the following single-pot method:

1. Initially, seven grams (7 g) of a tin (II) chloride dihydrate ($SnCl_2 \cdot 2H_2O$) is dissolved in a solution of 35 mL of absolute ethanol and 77 mL distilled water.
2. The resulting solution is stirred for 30 minutes.
3. The solution is acidified by the addition of 7 mL of 1.2M HCl, added dropwise, and the resulting solution is stirred for 15 minutes.
4. The solution is basified by the addition of 1M of an aqueous base, added dropwise until the pH of the solution is about 8.5.
5. The resulting opaque white suspension is then placed in a hot-water bath (~60° to 90° C.) for at least 2 hours while under stirring.
6. The suspension is then washed with distilled water and with absolute ethanol.
7. The washed suspension is dried at 100° C. for 1 hour in air and then annealed at 200° C. for 4 hours in air.

This method results in an AMO of tin, surface-functionalized with chlorine, whose pH is approximately 2 when measured in an aqueous solution at 5 wt % and room temperature. By definition its Hammet function, $H_0>-12$. Although an open system such as a flask is described here, a closed system such as an autoclave may also be used.

A person skilled in the art would recognize the method's parameters can be varied as is typical in hydrothermal synthesis. These parameters include, but are not limited to, type and concentration of reagents, type and concentration of acid and base, reaction time, temperature and pressure, stir rate and time, number and types of washing steps, time and temperature of drying and calcination, and gas exposure during drying and calcination. Variations may be conducted singly, or in any combination, preferably using experimental design methodologies. Additionally, other metal oxide synthesis methods—e.g., spray pyrolysis methods, vapor phase growth methods, electrodeposition methods, solid state methods, and hydro- or solvo thermal process methods—might be adaptable to achieve the same or similar results as the method disclosed here.

Figure 2:
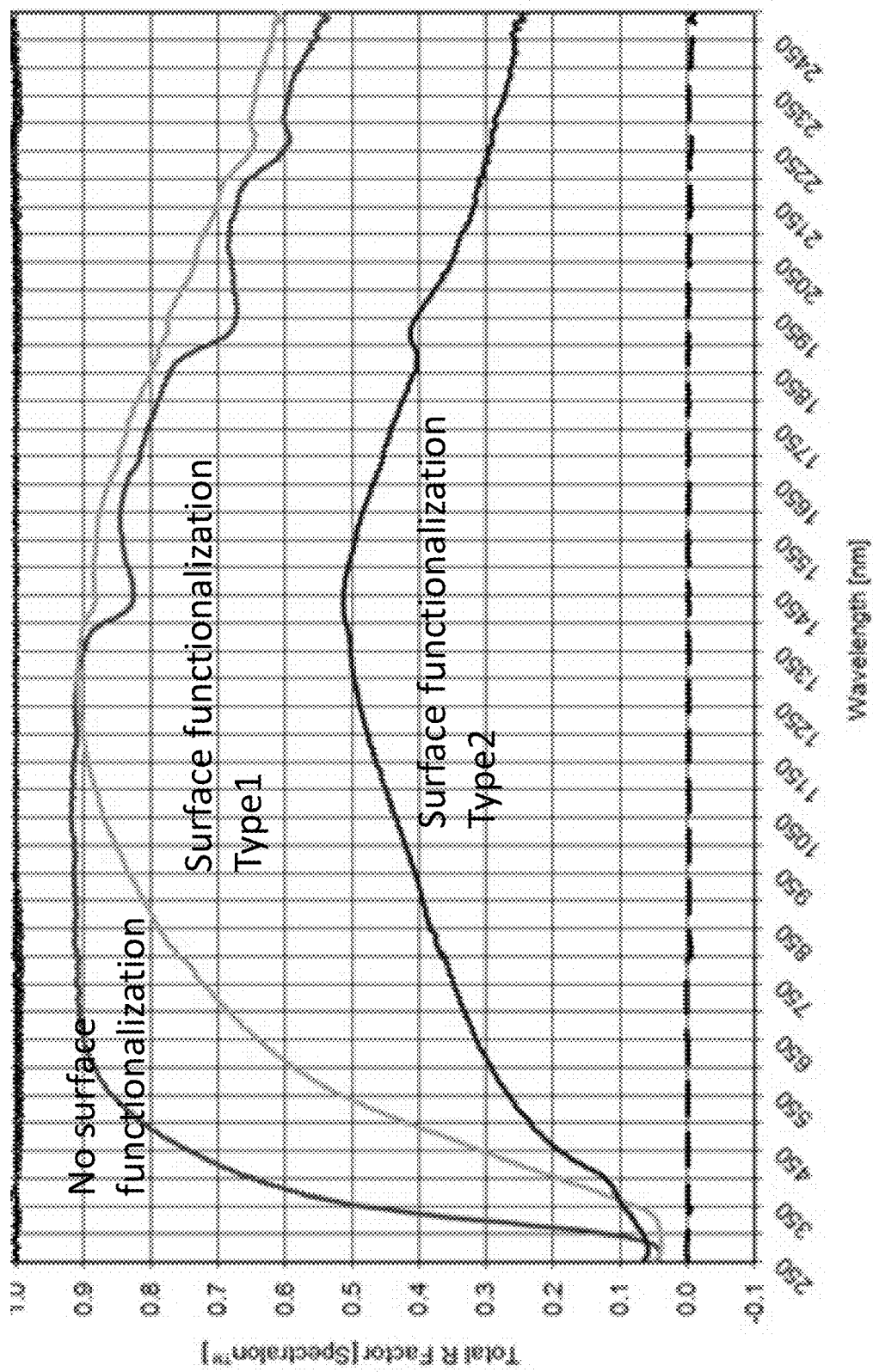
FIG. 2 shows the total reflectance of AMO tin oxide is different than that of commercially available, non-AMO tin oxide.

The performance characteristics of the AMO nanomaterial differ from those of non-acidified metal oxide nanoparticles. As one example, FIG. 1 shows differences in the cyclic voltammagram of AMO tin prepared by the single-pot method relative to that of commercially available, non-AMO tin when cycled against Li. As another example, FIG. 2 shows the total reflectance of AMO tin oxide is different than that of commercially available, non-AMO tin oxide. The data indicates that the AMO has a lower band gap and therefore more desirable properties as a component of a photovoltaic system.

The AMO material may be thought of as having the general formula

where
$M_mO_x$ is the metal oxide, m being at least 1 and no greater than 5, x being at least 1 and no greater than 21;
G is at least one EWG that is not hydroxide, and
/ simply makes a distinction between the metal oxide and the EWG, denoting no fixed mathematical relationship or ratio between the two.

G may represent a single type of EWG, or more than one type of EWG.

The preferred AMOs are acidified tin oxides ($SnxO_y$), acidified titanium dioxides ($Ti_aO_b$), acidified iron oxides ($Fe_cO_d$), and acidified zirconium oxide ($Zr_eO_f$). Preferred electron-withdrawing groups ("EWGs") are Cl, Br, $BO_3$, $SO_4$, $PO_4$ and $CH_3COO$. Regardless of the specific metal or EWG, the AMO material is acidic but not superacidic, yielding a pH<7 when suspended in an aqueous solution at 5 wt % and a Hammet function, $H_0>-12$, at least on its surface.

The AMO material structure may be crystalline or amorphous (or a combination thereof), and may be utilized singly or as composites in combination with one another, with non-acidified metal oxides, or with other additives, binders, or conductive aids known in the art. The AMO material may be added to a conductive aid material such as graphite or conductive carbon (or their equivalents) in a range of 10 wt % to 80 wt % and upwards of 90 wt % to 95 wt %. In preferred embodiments, the AMO was added at 10 wt %, 33 wt %, 50 wt %, and 80 wt %.

To maximize the amount of overall surface area available, the AMO should be in nanoparticulate form (i.e., less than 1 micron in size) and substantially monodispersed. More preferably, the nanoparticulate size is less than 100 nm and, even more preferably, less than 20 nm or 10 nm.

Mixed-metal AMOs, in which another metal or metal oxide is present in addition to the simple, or binary oxide, also have been reduced to practice. These mixed-metal AMOs may be thought of as having the general formula

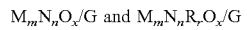

where:
M is a metal and m is at least 1 and no greater than 5;
N is a metal and n is greater than zero and no greater than 5;
R is a metal and r is greater than zero and no greater than 5;

O is total oxygen associated with all metals and x is at least 1 and no greater than 21;

/ simply makes a distinction between the metal oxide and the electron-withdrawing surface group, denoting no fixed mathematical relationship or ratio between the two; and G is at least one EWG that is not hydroxide.

G may represent a single type of EWG, or more than one type of EWG.

Some prior art mixed metal oxide systems, of which zeolites are the most prominent example, display strong acidity even though each simple oxide does not. Preferred embodiments of the mixed-metal AMO of this disclosure differ from those systems in that any embodiment must include at least one AMO which is acidic (but not superacidic) in simple $M_mO_x/G$ form. Preferred mixed metal and metal oxide systems are $Sn_xFe_cO_{y+d}$ and $Sn_xTi_aO_{y+b}$, where y+d and y+b may be an integer or non-integer value.

In a preferred embodiment, the mixed metal AMO material is produced via the single-pot method with one modification: synthesis begins with two metal precursor salts rather than one, in any proportion. For example, Step 1 of the single-pot method may be altered as follows: Initially, 3.8 g of tin (II) chloride dihydrate ($SnCl_2$ $2H_2O$) and 0.2 g of lithium chloride (LiCl) are dissolved in a solution of 20 mL of absolute ethanol and 44 mL distilled water.

Three metal precursor salts could also be used, in any proportion. The metal precursor salts could have the same or differing anionic groups, depending on the desired product; could be introduced at different points in the synthesis; or could be introduced as solids or introduced in a solvent.

Experimentation with the single-pot method led to seven key findings. First, in all cases both surface functionalization and acidity arise endogenously (see FIG. 3), rather than created post-synthesis. Unlike prior art surface functionalization methods, the single-pot method does not require any additional step or steps for surface functionalization beyond those required to synthesize the metal oxide itself, nor does it make use of hydroxyl-containing organic compounds or hydrogen peroxide.

Second, the method is broadly generalizable across a wide range of metal oxides and EWGs. Using the method, metal oxides of iron, tin, antimony, bismuth, titanium, zirconium, manganese, and indium have been synthesized and simultaneously surface-functionalized with chlorides, sulfates, acetates, nitrates, phosphates, citrates, oxalates, borates, and bromides. Mixed metal AMOs of tin and iron, tin and manganese, tin and manganese and iron, tin and titanium, indium and tin, antimony and tin, aluminum and tin, lithium and iron, and lithium and tin also have been synthesized. Additionally, surface functionalization can be accomplished using EWGs that are weaker than halogens and $SO_4$ yet still produce acidic but not superacidic surfaces. For example, the method also has been used to synthesize AMOs surface-functionalized with acetate ($CH_3COO$), oxalate ($C_2O_4$), and citrate ($C_6H_5O_7$).

Figure 4:
FIG. 4 shows differences in morphology between AMO nanoparticles synthesized under identical conditions except for the use of a different group for functionalization.
Figure 4:
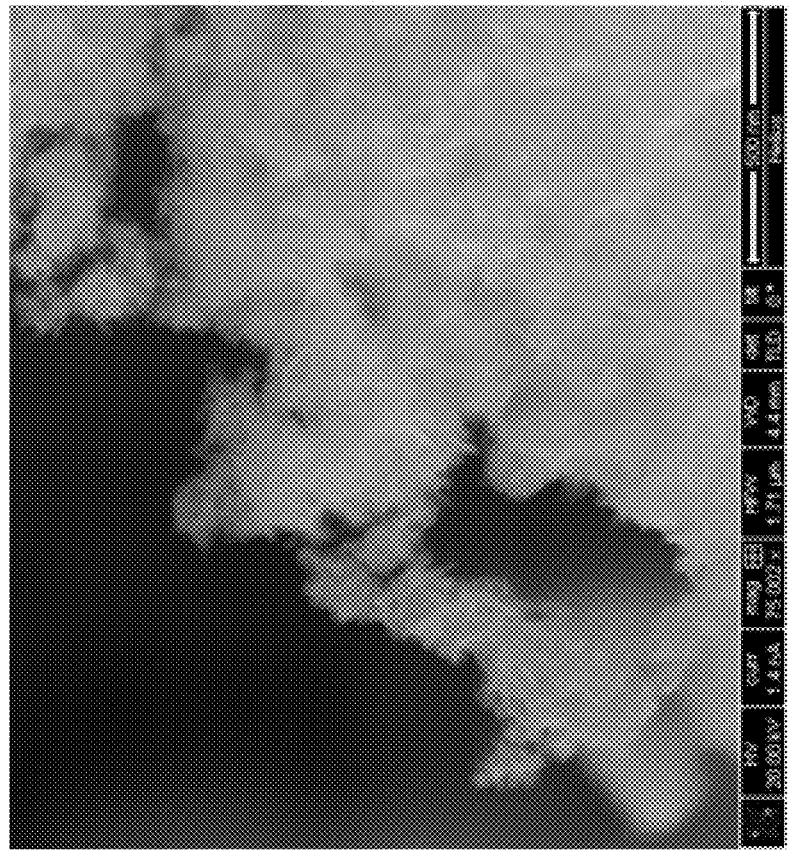

Third, there is a synergistic relationship between the EWG and other properties of the nanoparticles such as size, morphology (e.g., plate-like, spherical-like, needle- or rod-like), oxidation state, and crystallinity (amorphous, crystalline, or a mixture thereof). For example, differences in morphology can occur between AMO nanoparticles synthesized under identical conditions except for the use of a different EWG for surface functionalization (see FIG. 4). The surface functionalization may act to "pin" the dimensions of the nanoparticles, stopping their growth. This pinning may occur on only one dimension of the nanoparticle, or in more than one dimension, depending upon exact synthesis conditions.

Figure 5:
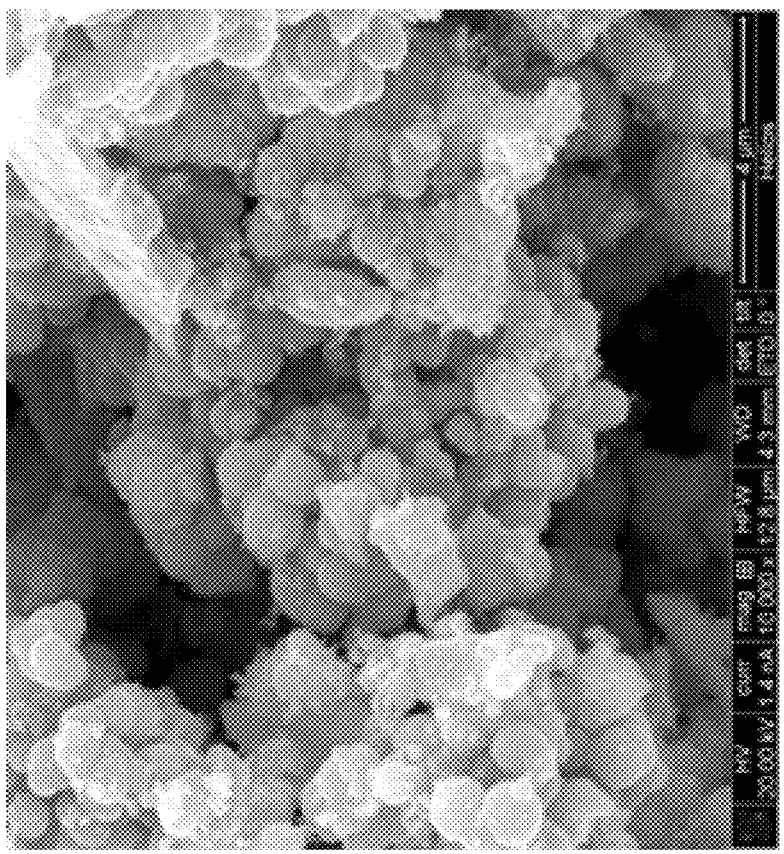
FIG. 5 shows the difference in morphology and performance of AMO nanoparticles synthesized under identical conditions except for having two different total reaction times.
Figure 5:
Figure 6:
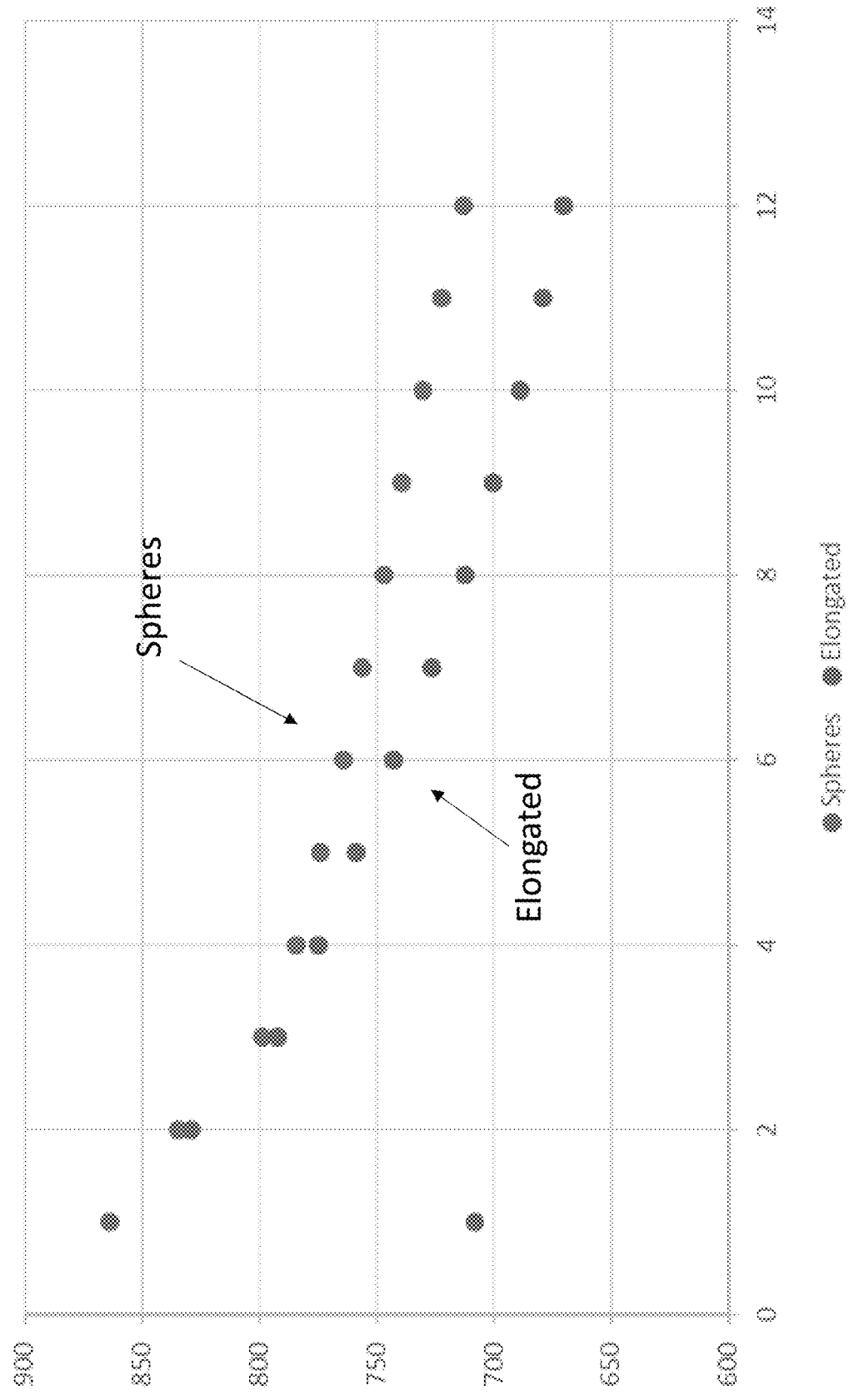
FIG. 6 is representative half-cell data showing differences in behavior between spherical and elongated (needle-like or rod-like) AMOs upon cycling against lithium.

Fourth, the character of the AMO is very sensitive to synthesis conditions and procedures. For example, differences in morphology and performance of the AMO's nanoparticles can occur when synthesized under identical conditions except for having two different total reaction times (see FIGS. 5 & 6). Experimental design methodologies can be used to decide the best or optimal synthesis conditions and procedures to produce a desired characteristic or set of characteristics.

Fifth, both the anion present in the precursor salt and the anion present in the acid contribute to the surface functionalization of the AMO. In one preferred embodiment, tin chloride precursors and hydrochloric acid are used in a synthesis of an AMO of tin. The performance of these particles differ from an embodiment in which tin chloride precursors and sulfuric acid are used, or from an embodiment in which tin sulfate precursors and hydrochloric acid are used. Therefore, matching the precursor anion and acid anion is preferred.

Sixth, when utilizing a precursor with a weak EWG and an acid with a strong EWG, or vice versa, the strongly withdrawing anion will dominate the surface functionalization. This opens up a broader range of synthesis possibilities, allowing functionalization with ions that are not readily available in both precursor salts and acids. It may also permit mixed functionalization with both strong and weak EWGs. In one example, a tin acetate precursor and phosphoric acid are used to synthesize an AMO of tin. X-ray photoelectron spectroscopy analysis of the surface shows a greater atomic concentrations of phosphorous than of the bonds associated with acetate groups (see FIG. 7).

Figure 8A:
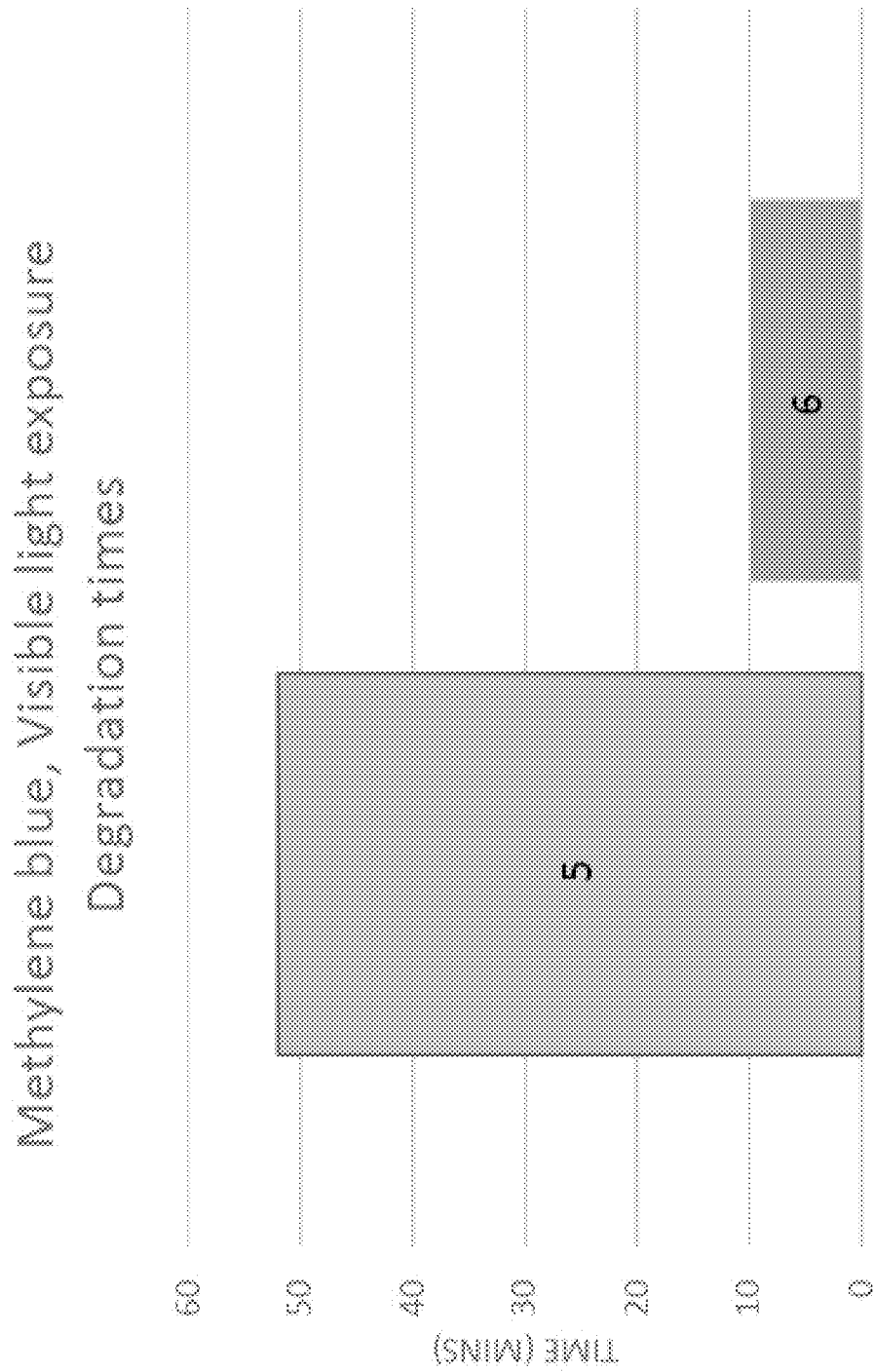
FIG. 8A shows an AMO which was more active than another AMO in visible light.
Figure 8B:
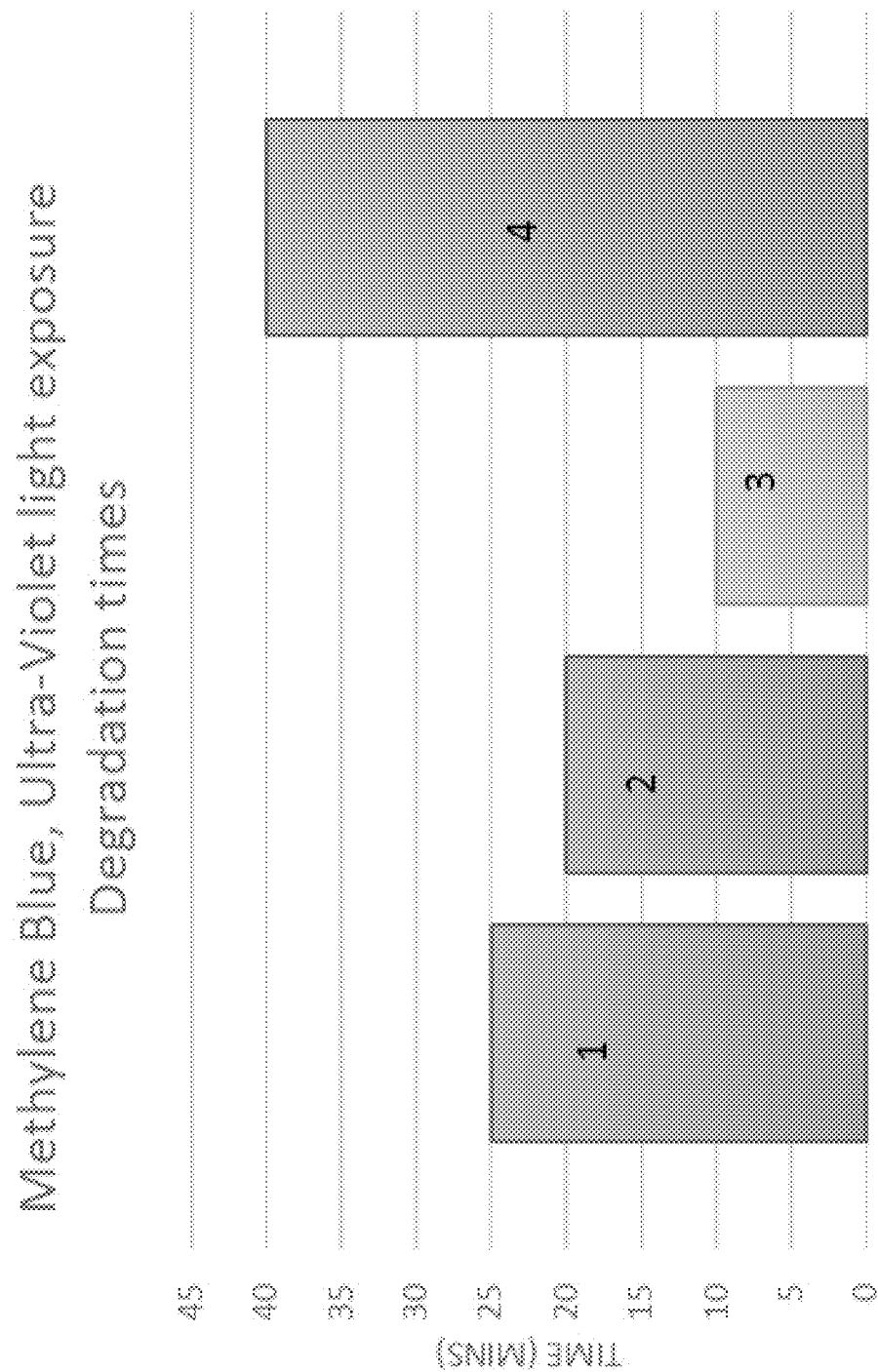
FIG. 8B shows an AMO which was more active than other AMOs in ultraviolet light.

Seventh, and last, while the disclosed method is a general procedure for synthesis of AMOs, the synthesis procedures and conditions may be adjusted to yield sizes, morphologies, oxidation states, and crystalline states as are deemed to be desirable for different applications. As one example, catalytic applications might desire an AMO material which is more active in visible light (see FIG. 8A) or one which is more active in ultraviolet light (see FIG. 8B).

Figure 9:
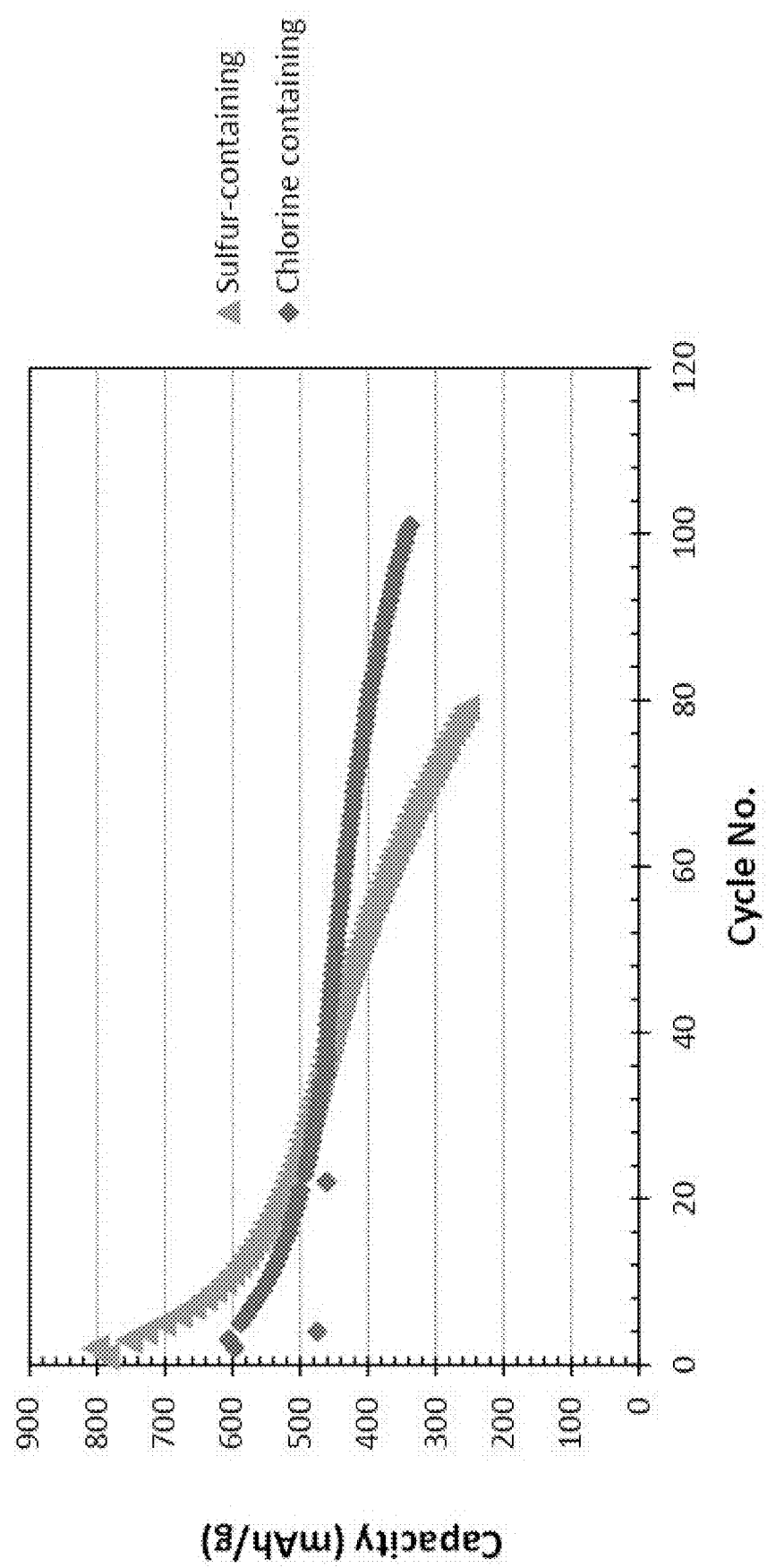
FIG. 9 is a graph comparing two AMOs, one having higher capacity for use in a primary (single use) battery application and the other having higher cyclability for use in a secondary (rechargeable) battery application.
Figure 10:
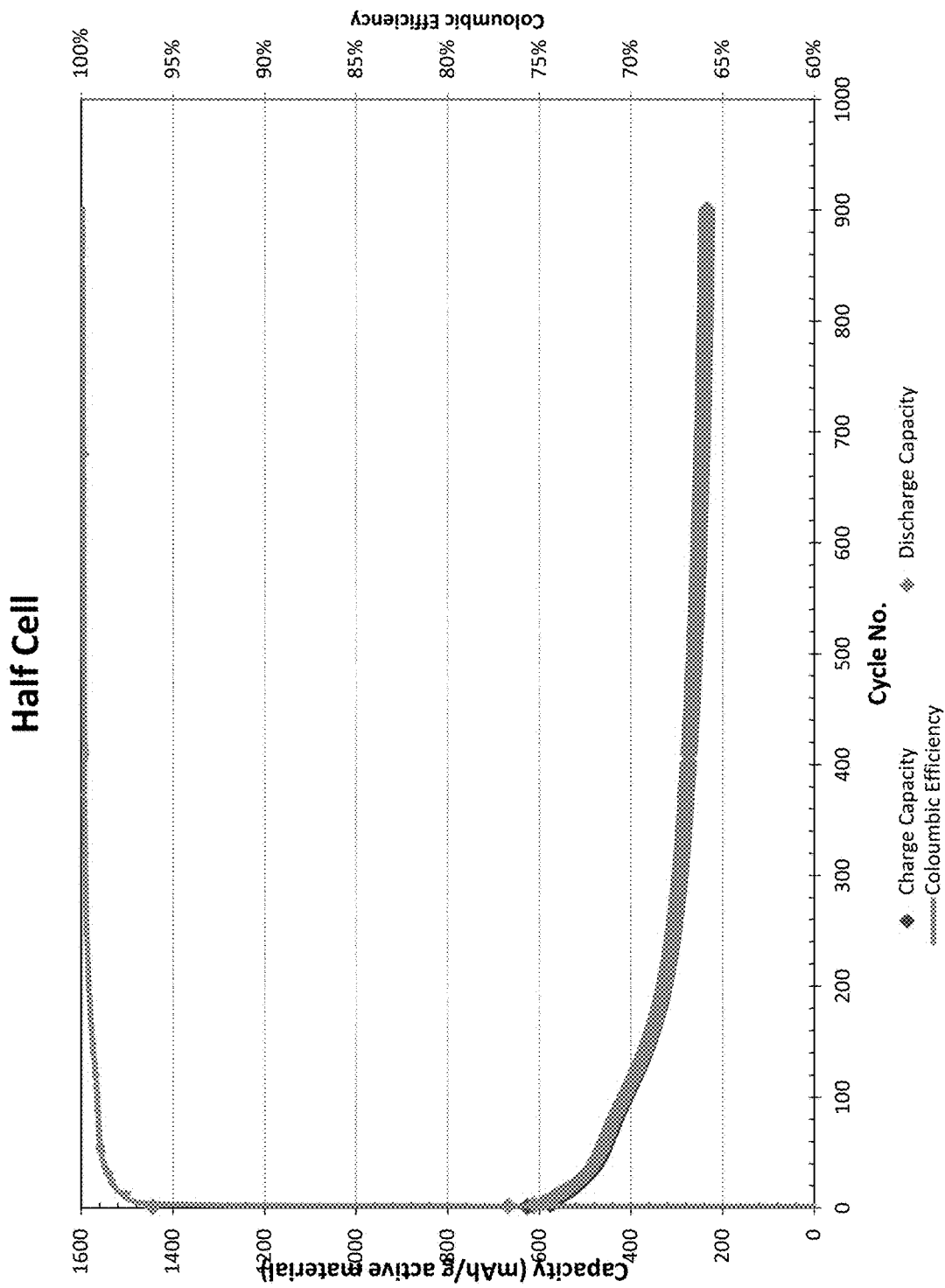
FIG. 10 shows AMOs can result in enhanced battery performance, without deterioration of battery components or gas generation.

In another example, the AMO material may be used as a battery electrode. A primary (single-use) battery application might desire an AMO with characteristics that lead to the highest capacity, while a secondary (rechargeable) battery application might desire the same AMO but with characteristics that lead to the highest cyclability (see FIG. 9). The AMO material can result in enhanced battery performance, without deterioration of battery components or gas generation (see FIG. 10). This is exactly opposite what the prior art teaches.

What is claimed:

1. A battery cell comprising:
   an electrode including a surface-functionalized solid metal oxide being in nanoparticulate form having a particle size less than 20 nm and a cyclability against lithium of at least 150 to 200 charge-discharge cycles wherein:
   the surface-functionalized solid metal oxide has, at least on its surface, a pH less than 5.5 and a Hammet function $H_0$ greater than −12; and
   the pH being measured when a dried form of the surface-functionalized solid metal oxide is re-suspended in water at 5 wt %.

2. A battery cell according to claim 1, the pH being in a range of 2 to 5.

3. A battery cell according to claim 1, wherein the cyclability is at least 300 charge-discharge cycles.

4. A battery cell according to claim 1, wherein the cyclability is at least 400 charge-discharge cycles.

5. A battery cell according to claim 1, wherein the cyclability is at least 500 charge-discharge cycles.

6. A battery cell according to claim 1, wherein the cyclability is at least 600 charge-discharge cycles.

7. A battery cell according to claim 1, wherein the cyclability is at least 700 charge-discharge cycles.

8. A battery cell according to claim 1, wherein the cyclability is at least 800 charge-discharge cycles.

9. A battery cell according to claim 1, wherein the cyclability is at least 900 charge-discharge cycles.

10. A battery cell according to claim 1, the surface-functionalized solid metal oxide being surface-functionalized with at least one electron-withdrawing group-having a molecular weight less than 200.

11. A battery cell according to claim 1, the surface-functionalized solid metal oxide being surface-functionalized with at least one electron-withdrawing group-having a carbon chain length no greater than 4.

12. A battery cell according to claim 1, the surface-functionalized solid metal oxide being surface-functionalized with at least one electron-withdrawing surface group selected from the group consisting of Cl, Br, $BO_3$, $SO_4$, $PO_4$, $CH_3COO$, $C_2O_4$, and $C_6H_5O_7$.

13. A battery cell according to claim 1, wherein a lithiation capacity of the surface-functionalized solid metal oxide is in a range of 900 mAh/g to at least 1400 mAh/g.

14. A battery cell according to claim 1, further comprising a second electrode including lithium metal.

15. A battery cell according to claim 1, the surface-functionalized solid metal oxide having a spherical morphology.

16. A battery cell according to claim 1, the surface-functionalized solid metal oxide having an elongated morphology.

17. A battery cell according to claim 1, the surface-functionalized solid metal oxide having a plate morphology.

18. A battery cell according to claim 1, the surface-functionalized solid metal oxide being substantially monodispersed.

19. A battery cell according to claim 1, the surface-functionalized solid metal oxide comprising iron oxide.

20. A battery cell according to claim 1, a metal of the surface-functionalized solid metal oxide comprising one or more of antimony, bismuth, titanium, zirconium, manganese, or indium.

21. A battery cell according to claim 1, wherein the electrode is configured as an anode.

22. A battery cell according to claim 1, the surface-functionalized solid metal oxide comprising 10 wt % to 50 wt % of the electrode.

23. A battery cell according to claim 1, the surface-functionalized solid metal oxide comprising 10 wt % to 33 wt % of the electrode.

24. A battery cell according to claim 1, the surface-functionalized solid metal oxide comprising 33 wt % to 50 wt % of the electrode.

25. A battery cell according to claim 1, the surface-functionalized solid metal oxide comprising 50 wt % to 80 wt % of the electrode.

26. A battery cell comprising:
an electrode including a surface-functionalized solid metal oxide in nanoparticulate form having a particle size less than 20 nm and a and a cyclability against lithium of at least 150 to 200 charge-discharge cycles;
the surface-functionalized solid metal oxide further characterized by a formula $M_mO_x/G$, where
$M_m$ is a metal, m is at least 1 and no greater than 5;
$O_x$ is total oxygen, x is at least 1 and no greater than 21;
$M_mO_x$ is a metal oxide;
G is at least one electron-withdrawing surface group, and "/" makes a distinction between the metal oxide and the electron-withdrawing surface group;
wherein:
the surface-functionalized solid metal oxide has, at least on its surface, a pH less than 5.5 and a Hammet function Ho greater than −12;
the pH being measured when a dried form of the surface-functionalized solid metal oxide is re-suspended in water at 5 wt %.

27. A battery cell according to claim 26, the pH being in a range of 2 to 5.

28. A battery cell according to claim 26, wherein the cyclability is at least 300 charge-discharge cycles.

29. A battery cell according to claim 26, wherein the cyclability is at least 400 charge-discharge cycles.

30. A battery cell according to claim 26, wherein the cyclability is at least 500 charge-discharge cycles.

31. A battery cell according to claim 26, wherein the cyclability is at least 600 charge-discharge cycles.

32. A battery cell according to claim 26, wherein the cyclability is at least 700 charge-discharge cycles.

33. A battery cell according to claim 26, wherein the cyclability is at least 800 charge-discharge cycles.

34. A battery cell according to claim 26, wherein the cyclability is at least 900 charge-discharge cycles.

35. A battery cell according to claim 26, the surface-functionalized solid metal oxide being surface-functionalized with at least one electron-withdrawing group-having a molecular weight less than 200.

36. A battery cell according to claim 26, the surface-functionalized solid metal oxide being surface-functionalized with at least one electron-withdrawing group-having a carbon chain length no greater than 4.

37. A battery cell according to claim 26, the surface-functionalized solid metal oxide being surface-functionalized with at least one electron-withdrawing surface group selected from the group consisting of Cl, Br, $BO_3$, $SO_4$, $PO_4$, $CH_3COO$, $C_2O_4$, and $C_6H_5O_7$.

38. A battery cell according to claim 26, wherein a lithiation capacity of the surface-functionalized solid metal oxide is in a range of 900 mAh/g to at least 1400 mAh/g.

39. A battery cell according to claim 26, further comprising a second electrode including lithium metal.

40. A battery cell according to claim 26, the surface-functionalized solid metal oxide having a spherical morphology.

41. A battery cell according to claim 26, the surface-functionalized solid metal oxide having an elongated morphology.

42. A battery cell according to claim 26, the surface-functionalized solid metal oxide having a plate morphology.

43. A battery cell according to claim 26, the surface-functionalized solid metal oxide being substantially monodispersed.

44. A battery cell according to claim 26, the metal being iron.

45. A battery cell according to claim 26, the metal selected from the group consisting of antimony, bismuth, titanium, zirconium, manganese, and indium.

46. A battery cell according to claim 26, wherein the electrode is configured as an anode.

47. A battery cell according to claim 26, the surface-functionalized solid metal oxide comprising 10 wt % to 50 wt % of the electrode.

48. A battery cell according to claim 26, the surface-functionalized solid metal oxide comprising 10 wt % to 33 wt % of the electrode.

49. A battery cell according to claim 26, the surface-functionalized solid metal oxide comprising 33 wt % to 50 wt % of the electrode.

50. A battery cell according to claim 26, the surface-functionalized solid metal oxide comprising 50 wt % to 80 wt % of the electrode.

* * * * *